US011395243B2

(12) United States Patent
De La Cruz et al.

(10) Patent No.: US 11,395,243 B2
(45) Date of Patent: Jul. 19, 2022

(54) INCREASING SYNCHRONIZATION OF VIRTUAL REALITY SCENE ELEMENTS WITH SOFTWARE DEFINED NETWORK (SDN) ORIGINATED INFORMATION

(71) Applicant: Cisco Technology, Inc., San Jose, CA (US)

(72) Inventors: Sergio Mena De La Cruz, Saubraz (CH); Lorenzo Granai, Crissier (CH); Malcolm Muir Smith, Richardson, TX (US); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 316 days.

(21) Appl. No.: 16/655,083

(22) Filed: Oct. 16, 2019

(65) Prior Publication Data

US 2021/0120507 A1 Apr. 22, 2021

(51) Int. Cl.
*H04W 56/00* (2009.01)
*H04W 12/037* (2021.01)
*G06F 3/01* (2006.01)
*H04L 5/00* (2006.01)
*H04L 47/80* (2022.01)
*H04L 67/131* (2022.01)
(Continued)

(52) U.S. Cl.
CPC .......... *H04W 56/001* (2013.01); *G06F 3/011* (2013.01); *H04L 5/006* (2013.01); *H04L 47/801* (2013.01); *H04L 67/38* (2013.01); *H04W 12/037* (2021.01); *H04W 28/0215* (2013.01); *H04W 72/044* (2013.01)

(58) Field of Classification Search
CPC ........... H04W 56/7001; H04W 12/037; H04W 28/0215; H04W 72/044; G06F 3/011; H04L 5/006; H04L 47/801; H04L 67/38
USPC ........................................................ 370/390
See application file for complete search history.

(56) References Cited

U.S. PATENT DOCUMENTS

2007/0008967 A1\* 1/2007 Bressler .................. H04L 47/15
370/390
2019/0041976 A1 2/2019 Veeramani et al.
(Continued)

FOREIGN PATENT DOCUMENTS

WO 2018/182688 A1 10/2018

OTHER PUBLICATIONS

Hamza-Lup et al., "Scene Synchronization for Real-Time Interaction in Distributed Mixed Reality and Virtual Reality Environments", arxiv, Dec. 8, 2018, pp. 1-27.
(Continued)

*Primary Examiner* — Sai Ming Chan
(74) *Attorney, Agent, or Firm* — Merchant & Gould P.C.

(57) ABSTRACT

Aspects herein generally relate to a system and/or a method for enforcing synchronization of WiFi users interacting with a common hierarchical multi-element VR/AR scene. The aspects can use Orthogonal Frequency Division Multiple Access (OFDMA) and trigger frames to synchronize parallel updates to different scene elements. Deep Packet Inspection (DPI) can be used to analyze standard VR/AR streaming formats to identify those VR scene elements that are to be synchronized. The result is a more immersive AR/VR experience for the users, who receive the same scene elements at the same time.

20 Claims, 7 Drawing Sheets

(51) Int. Cl.
   *H04W 28/02*      (2009.01)
   *H04W 72/04*      (2009.01)

(56) References Cited

U.S. PATENT DOCUMENTS

2019/0045534 A1    2/2019   Zaks et al.
2019/0274171 A1*   9/2019   Viger ............... H04W 74/0833

OTHER PUBLICATIONS

Ahn et al., "Virtual Reality-Wireless Local Area Network: Wireless Connection-Oriented Mrtual Reality Architecture for Next-Generation Virtual Reality Devices", Semantic Scholar, Jan. 3, 2018, pp. 1-16.
Thornycroft, Peter, Why OFDMA is a Magical Feature in 802.11ax, [https://biogs.arubanetworks.com/spectrum/ /why-ofdma-is-a-magical-feature-in-802-11ax-standard/] 30 Jul. 7, [retrieved Jan. 14, 2021] (8 pages).
International Search Report and Written Opinion issued in International Application No. PCT/US2020/054986 dated Jan. 26, 2021 (16 pages).

* cited by examiner

INCREASING SYNCHRONIZATION OF VIRTUAL REALITY SCENE ELEMENTS WITH SOFTWARE DEFINED NETWORK (SDN) ORIGINATED INFORMATION

TECHNICAL FIELD

The aspects generally relates to electronic communications. More particularly, the systems and methods relate to wireless communications.

BACKGROUND

Applications of Virtual Reality (VR) and Augmented Reality (AR) have expanded over the years. Some of the applications include interactive multi-user VR/AR over wireless networks. For example, some VR/AR applications (e.g., conferencing, video games, etc.), where the users should see a consistent VR/AR scene (e.g., a same set of visual objects in the same viewed environment), require synchronized updates to the multiple scene elements for the various users. Exacerbating the demands of synchronized updates across multiple users, some applications or users may additionally require that the VR/AR traffic be encrypted.

The challenge with the above scenario is that real-time updates to the scene elements, made by the users, then have stringent requirements in terms of latency, bandwidth, privacy/confidentiality, synchronization of updates to the scene elements, etc. Finding systems and methods accomplishing these objectives is difficult, if not impossible.

SUMMARY

The aspects include a method or system that includes an access point (AP) that can identify information in a first data packet that is associated with a Virtual Reality (VR) session. The AP may then identify the information in a second data packet, addressed to a first Station (STA), and in a third data packet, addressed to a second STA. Based on the identification of the information, the AP can determine that the second data packet and the third data packet are also associated with the VR session. The AP can then, based on the association of the first and second data packets with the VR session, schedule a first resource unit, in a transmission to the first STA and second STA, to include the second data packet and schedule a second resource unit, in the transmission, to include the third data packet.

Figure 1:
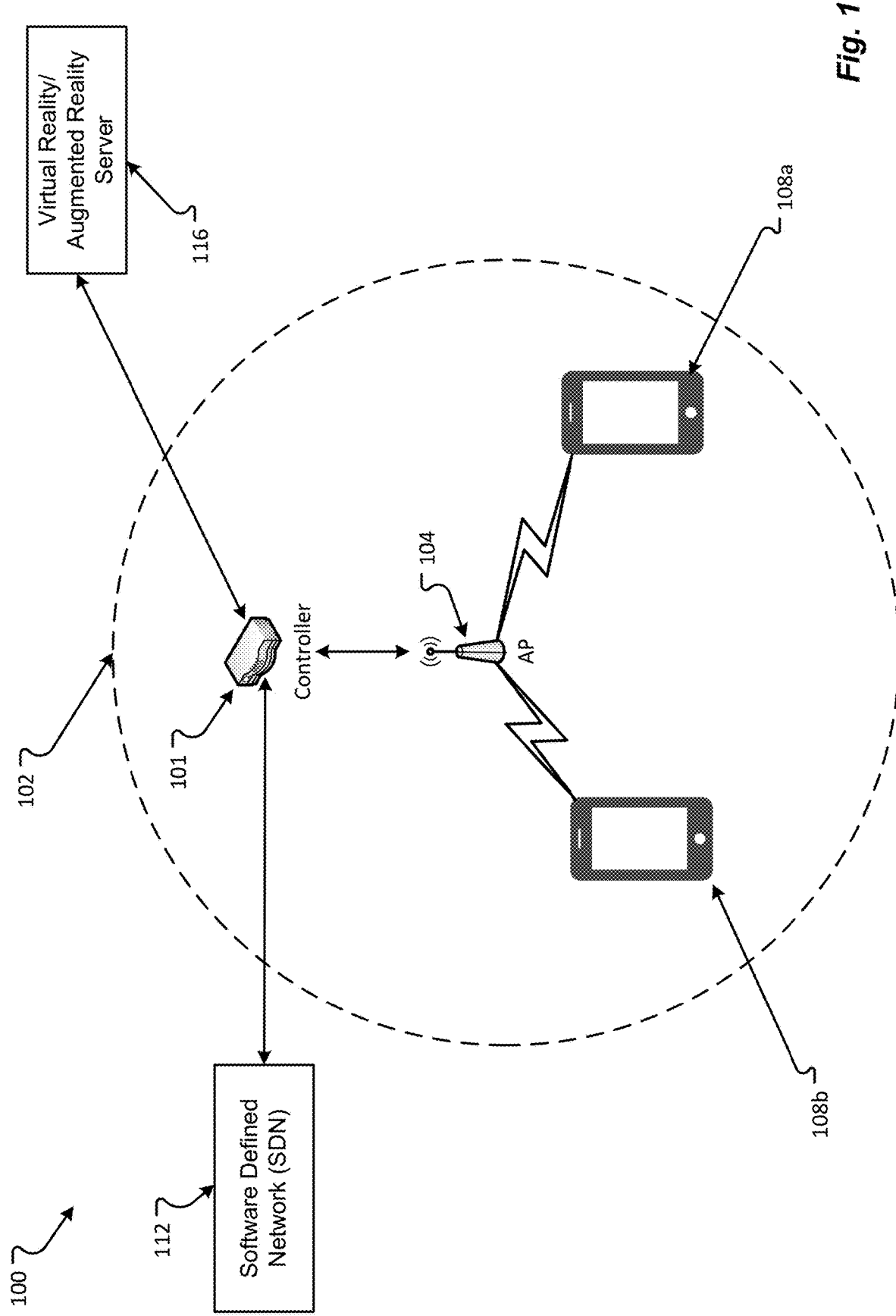
FIG. 1 illustrates an environment having a basic service set in accordance with aspects of the current disclosure.

In the drawings, like numerals can refer to like components. A letter following the numeral indicates another instance of the same type of component. Like components can share the description of that component. When referring to a component without the letter following the numeral, all components having that numeral indicator may share that description.

DETAILED DESCRIPTION

Overview

Aspects herein generally relate to a system and/or a method for enforcing synchronization of WiFi users interacting with a common hierarchical multi-element VR/AR scene. The aspects can use Orthogonal Frequency Division Multiple Access (OFDMA) and trigger frames to synchronize parallel updates to different scene elements. Deep Packet Inspection (DPI) can be used to analyze standard VR/AR streaming formats. In some configurations, SDN infrastructure information or inferences can be used to determine information about scene updates for use with unknown or encrypted VR/AR formats. The result is a more immersive AR/VR experience for the users, who receive the same scene elements at the same time. The result is also a better optimization of the 802.11ax scheduler and better utilization of Resource Unit (RU) resources.

The aspects have particular functional elements. First, the system can use OFDMA and Trigger-based Random Access features. Second, the system can use DPI technology, e.g., Cisco's NBAR2 engine, to determine information about VR/AR scene elements and/or updates. Next, the system can deduce knowledge of VR/AR composite scene encoding standards, for example, Binary Format for Scenes (BIFS), Lightweight Application Scene Representation (LASeR), or other standards. Finally, the systems and methods may recognize and use the presence of SDN-like infrastructure (e.g. Cisco Digital Network Architecture Center (DNAC)) to distribute VR/AR flow information.

The system architecture can include one or more client Station (STAs) are connected to the VR server via Wifi6. Physical network elements can include controllers, Access Points (APs), STAs etc. Each of these physical network elements can include various subsystems. Some configurations include a SDN to identify the VR scene elements. Further, a VR server can be separate from the SDN domain (e.g., in the cloud); however the VR server could also be located inside the SDN domain.

OFDMA offers the ability to communicate to multiple WiFi STAs contemporaneously, where multiple RUs can be allocated in a single transmission, thus allowing for frequency-based multiplexing. Aspects employ a DPI process that can execute on the AP, a set of APs, a wireless controller/Wireless Local Access Network (LAN) Controller (WLC), and/or a router to analyze packets related to VR/AR scenes (or scene updates). Scene elements are known as sub-scenes in some standards. The DPI process can detect to which scene element each packet belongs and may classify the packet accordingly (e.g., using L2 or L3 Quality of Service (QoS) tags) for one or more APs (for example, using either a unicast or a multi-cast destination address).

The DPI process includes DPI rules, which can be created to leverage knowledge of the VR streaming format standard used. For example, in BIFS [MPEG4_11], the DPI process can detect the different X3D "component" tags. With LASeR [MPEG4_20], the DPI process may detect safAU.streamID field in the data packets. In other formats, the DPI process can develop other DPI rules or format-specific tags and content detection to detect the (hierarchical) elements of the VR/AR scene. Whatever the standard used as VR/AR streaming format, the DPI rules, in at least some configurations, may not parse the whole multi-element scene, rather, the DPI rules can identify the different scene elements, and so updates to these scene elements can be recognized efficiently. This focused detection allows the aspects herein to run efficiently on devices with limited comporting resources (e.g. the APs). The method can of course also be implemented in larger systems (e.g. at the WLC or compute resource in the path).

Additionally or alternatively, VR/AR applications, executing on wireless clients (STAs), can advertise, to the SDN infrastructure, with which the different sub-scenes the application may be interacting (typically, less than 8). The SDN server can then reply with the fine-grain L2 or L3 QoS tag(s) that the VR/AR application can use for each sub-scene. Here, the aspects may assume that not all bits of the QoS tag(s) are needed for regular QoS treatment (for example, a coarse-grained form of QoS is present or not), and thus, some QoS bits can actually carry sub-scene information. If Internet Protocol version 6 (IPv6) is used, the "flow label" field in the IPv6 header (or part of it) is also a good candidate to convey sub-scene information.

The information in the IPv6 header and/or QoS tags are particularly useful if the VR/AR streaming traffic is encrypted, and the DPI technique, explained above, is unable to recognize the streaming format (e.g., the encryption is masking the safAU.streamID field in LASeR). By inspecting the fine-grain QoS tags, and carefully choosing (multicast/unicast) destination addresses and/or L4 ports, the AP or WLC can figure out which sub-scene element each packet belongs to in the upstream and/or downstream direction. It is also possible to combine the DPI-based and SDN-based techniques explained above to obtain better results.

When packets of parallel sub-scenes are detected (e.g. by DPI on the WLC, the AP, and/or the router) or advertised (by VR/AR clients to the SDN infrastructure) and classified accordingly (as per above), each AP can then schedule different (unicast) or shared (multicast) RUs within the same Transmit Opportunity (TXOP) to transmit those packets in contemporaneously or in synchronicity. In this way, the system can fulfill any requirement of the single/multi-user VR application to update clients STAs contemporaneously or near simultaneously. For each packet of a parallel sub-scene update to be sent to one or more of the wireless client STAs (AP is the sender), the AP reserves either a unicast RU (single Association Identifier (AID)) or multicast RU (group AID) based on the QoS tag. This process allows for priority driven RU assignment.

In the uplink to the AP, the same synchronization may be desired since the VR/AR render engine has a finite time to compute the scene update and cannot wait for client scene updates to arrive at random times after transmission. To meet this need, the system can implement Uplink-OFDMA (UL-OFDMA), which is trigger-based, using the Buffer Status Report Poll (BSRP) process to signal the client's (STA) intent to initiate a sub-scene update, e.g., because the client interacted with and/or modified the VR/AR sub-scene.

Since both directions are synchronized and there is an inherent processing delay (i.e. VR user sees image, moves HMD based on new view, etc.), the 802.11ax scheduler performs the following sequence in the context of the VR application. A maximal Downlink OFDMA (DL-OFDMA) frame (many parallel scenes/RU assignments, largest TXOP, etc.) followed by a Short InterFrame Space (SIFS) is transmitted. The system also uses (zero or more) non-related short Physical Layer Convergence Procedure (PLCP Protocol Data Unit (PPDU) sequences to achieve a suitable VR response time (e.g. 1 ms). The system can then poll for uplink VR scene updates with BSRP (if the number of associated STA in the VR session is low or sparse). The system may then send a trigger-frame (TF) allocating RUs to STAs discovered via polling and/or RUs allocated via UL OFDMA-based Random Access (UORA), if the number of STAs, in the VR session, is high. Then the system sends a UL-OFDMA frame from the VR STA to allocate the RUs assigned above.

The overall effect of the multi-user VR/AR application is that contemporaneous or simultaneous updates to sub-streams can be transmitted (whether upstream or downstream) near simultaneously over the air, as long as enough RUs are available in the current TXOP. Moreover, if the scene updates are relatively simple (i.e., the updates do not take much bandwidth), the system can synchronize a large number of wireless clients interacting in the same VR/AR scene. Further, the DPI process can also be executed on the WLC or on the SDN controller, which can execute watch routines on the packet flows and identify subscenes when the video codec does not provide detailed labels.

The aspects include a method where, two or more users connect through the same access point to the same AR/VR content server. Such connection can be detected by a process running on the WLC through matching QoS marking(s), DNS similarities, explicit signaling from the AR/VR application to the SDN infra, or other techniques. In at least some configurations, the coexistence of Uniform Resource Locator (URL) and QoS marking(s) in the real time traffic can be used to identify the joint sessions. As the WLC (or AP) detects the AR/VR flows, a watch instruction may be sent to the AVC engine running on the AP. The watch function observes payloads sent to the concurrent session STAs, and observes similarities in these payloads. For example, the watch function may be alerted when upper layer objects are detected. The watch function can then record the destination (target client) and tag profile (e.g. TagName=TouchSensor, Namespace=3D, objectID=555, size=2 2 2).

If the recognition of the VR streaming format is not possible (e.g., due to encryption, or because the VR streaming format is unknown to DPI engine), the system may detect the QoS tags (L2 or L3), assigned by the SDN infrastructure, to distinguish the packets belonging to different sub-scenes. These finer-grained QoS levels are only used to identify to which sub-scene a packet belongs.

As more flows are observed, the watch routine can detect that the same tag is sent to different STAs. The watch routine may also measure the time interval between the transmissions of the identical flows to two or more STAs. At configurable or automated intervals, the watch routine may then determine that the same tag(s) are sent to two or more STAs at close intervals. When the interval is small and the order of transmission is non-deterministic (for example, sometimes STA1 then STA2, sometimes concurrent, sometimes STA2 then STA1), the watch routine can determine that the data packet with the tag is intended to be sent at the same time. The system can configure or accept a benchmark for the transmission delay of data packets with the same tag, being sent to two or more STAs. A larger difference in the transmission delay can indicate that the intent to have the receiver STAs perceive time differences (i.e. one STA is expected to see the item before the other). When the transmission delay interval is smaller, for example, below human time perception abilities (e.g. below Bloch's thresholds of 5 ms or less), then the intent of the VR/AR server is likely to have both STAs receive the data block at the same time. The system can determine this intent for simultaneous reception at the STAs.

When the watch function determines that the data block is to be received at two or more STAs contemporaneously, the watch routine can send an instruction to the AP scheduler to start coordinating the transmission of the identified payloads using RU assignments, as described above. The result is that users receive and perceive the target elements nearly at or at the same time, thus making the AR/VR experience more immersive from a user standpoint and more efficient from the network standpoint.

Aspects herein are generally directed to wireless communications systems that can perform according to one or more wireless communications standards. For example, some aspects may involve wireless communications performed according to Wi-Fi standards developed by the IEEE 802.11, for example, may involve wireless communications performed in accordance with an IEEE 802.11ax. Some aspects may involve wireless communications performed in accordance with other standards, rules, regulations, guidance, etc. Some aspects may additionally or alternatively involve wireless communications according to one or more other wireless communication standards, for example, and without limitation, other IEEE wireless communication standards, such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11 ah, and/or IEEE 802.11ay standards, Wi-Fi Alliance (WFA) wireless communication standards, such as, Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, Machine-Type Communications (MTC) standards such as those embodied in 3GPP Technical Report (TR) 23.887, 3GPP Technical Specification (TS) 22.368, and/or 3GPP TS 23.682, and/or Near-Field Communication (NFC) standards such as standards developed by the NFC Forum, including any predecessors, revisions, progeny, and/or variants of any of the above.

Likewise, some aspects may involve wireless communications performed according to one or more broadband wireless communication standards, for example, 3rd Generation Partnership Project (3GPP), 3GPP Long Term Evolution (LTE), and/or 3GPP LTE-Advanced (LTE-A) technologies and/or standards. Additional examples of broadband wireless communication technologies/standards may include Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1.times.RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards.

Example Embodiments

Embodiment of an environment 100 including a basic service set (BSS) 102 may be as shown in FIG. 1. The components of the BSS 102 may communicate with a VR/AR server 116. The VR/AR server 116 can provide an environment for virtual reality or augmented reality scenes that are rendered and sent to one or more client STAs 108 of the BSS 102. The STAs 108a, 108b may be experiencing the same VR session and/or receiving similar VR scene elements.

The environment 100 can include one or more of, but is not limited to, a controller/WLC 101, an AP 104, one or more client STAs 108a, 108b, and/or a controller of the SDN 112. Each of these different systems or components, along with the VR/AR server 116, may be hardware, software, or a combination of hardware and software. Each of the various components 101 through 116 can be as described in conjunction with FIG. 7.

The STAs 108 may include one or more High-Efficiency Wireless (HEW) (as illustrated in, e.g., the IEEE 802.11ax standard) STAs, future defined types of STAs, and/or one or more legacy (as illustrated in, e.g., the IEEE 802.11n/ac standards) STAs. The STAs 108 may be wireless devices, for example, a cellular telephone, a smart telephone, a handheld wireless device, wireless glasses, a wireless watch, a wireless personal device, a tablet, or another device that may be transmitting and receiving using an IEEE 802.11 protocol. In the operating environment, an AP 104 may generally manage access to the wireless medium in the WLAN for the STA 108.

Figure 7:
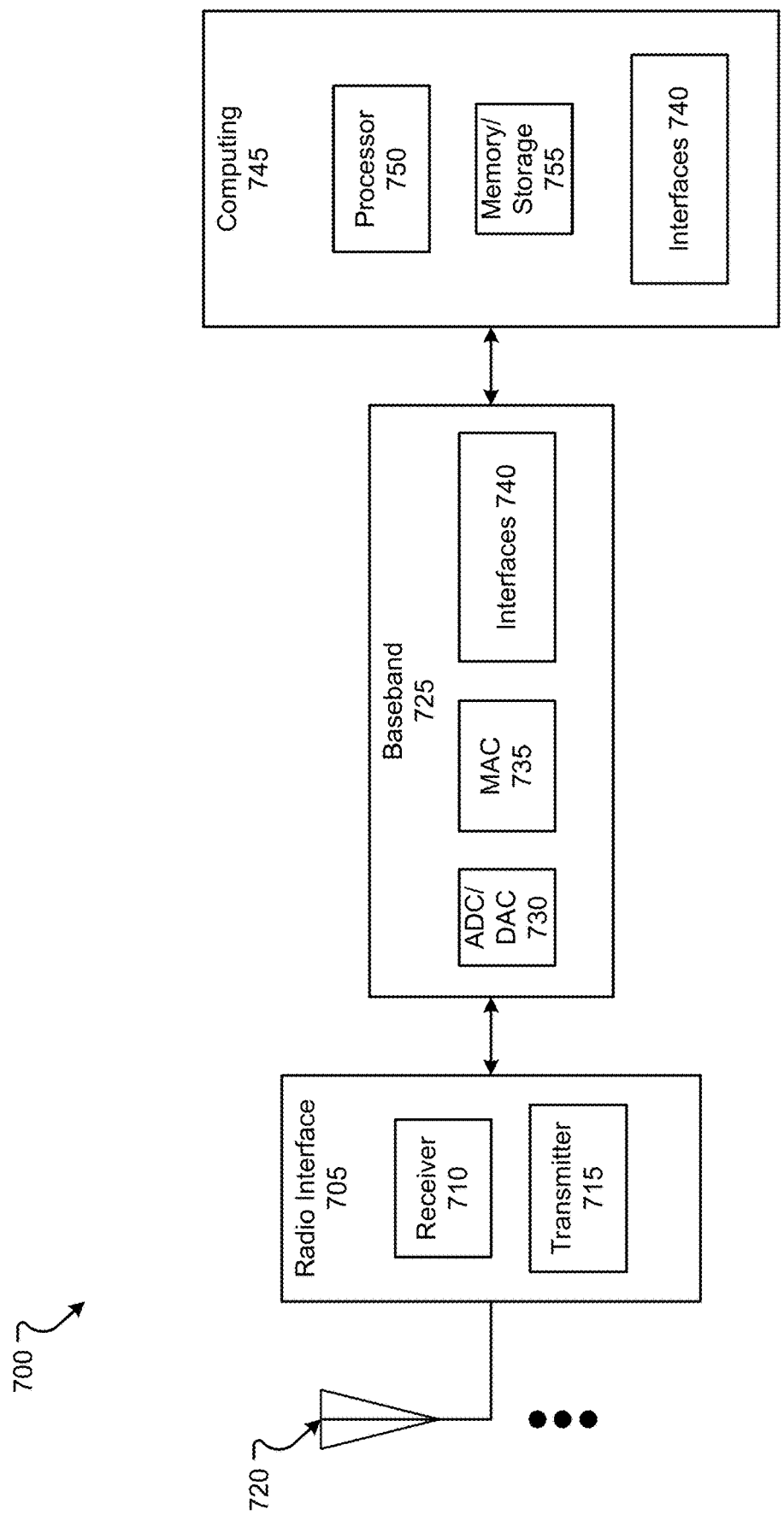
FIG. 7 illustrates an embodiment of a STA or access point in accordance with aspects of the current disclosure.

The AP 104 may be a base station and may use other communications protocols as well as the IEEE 802.11 protocol. The IEEE 802.11 protocol may include using OFDMA, Time Division Multiple Access (TDMA), and/or code division multiple access (CDMA). The IEEE 802.11 protocol may include a multiple access technique. For example, the IEEE 802.11 protocol may include Space-Division Multiple Access (SDMA) and/or Multiple-User Multiple-Input Multiple-Output (MU-MIMO). An example configuration of the APs 104 and/or controllers 101 may be as shown in FIG. 7.

The environment includes the BSS 102 and/or an Extended Service Set (ESS) (which may also be represented by dashed circle 102), one or more STAs 108 may associate and/or communicate with the AP 104 to join the WLAN. Joining the WLAN may enable STAs 108 to wirelessly communicate with each other via AP 104, with each other directly, with the AP 104, or to another network or resource through the AP 104. In some configurations, to send data to a recipient, a sending STA may transmit an Uplink (UL) Physical Layer Convergence Procedure (PLCP) Protocol Data Unit (PPDU) comprising the data, to AP 104, which may then send the data to the recipient STA 108, in a Downlink (DL) PPDU. The PLCP is the physical layer protocol that is used with 802.11 and other standards.

In some configurations, a frame of data transmitted between the STAs 108 or between a STA 108 and the AP 104 may be configurable. For example, a channel used for communication may be divided into subchannels that may be 20 MHz, 40 MHz, or 80 MHz, 160 MHz, of contiguous bandwidth or an 80+80 MHz (160 MHz) of non-contiguous bandwidth. Further, the bandwidth of a subchannel may be incremented into 1 MHz, 1.25 MHz, 2.03 MHz, 2.5 MHz, 5 MHz 10 MHz bandwidths, a combination thereof, or any other bandwidth division that is less or equal to the available bandwidth may also be used. The bandwidth of the sub-channels may be based on a number of active subcarriers. The bandwidth of the subchannels can be multiples of 26 (e.g., 26, 52, 104, etc.) active subcarriers or tones that are spaced by 20 MHz. In some configurations, the bandwidth of the subchannels is 256 tones spaced by 20 MHz. In other configurations, the subchannels are a multiple of 26 tones or a multiple of 20 MHz. A 20 MHz subchannel may also comprise 256 tones for use with a 256 point Fast Fourier Transform (FFT); however, other combinations are possible and using 256 tones in a 20 MHz subchannel is not necessary to execute the methods herein.

When managing access to the wireless medium in the WLAN of environment 100, the AP 104 may schedule medium access, for the sending STA 108b, during a UL time interval, during which the AP 104 may refrain from transmitting over the wireless medium. The UL time interval may comprise a portion of a Transmit Opportunity (TXOP) owned by AP 104.

At a given point in time, multiple STAs, in the WLAN of environment 100, may wish to send data. In some configurations, rather than scheduling medium access for STAs 108 in different respective UL time intervals, the AP 104 may schedule medium access for STAs 108 to support UL MU transmission techniques, according to which multiple STAs 108 may transmit UL MU PPDUs to the AP 104 simultaneously during a given UL time interval. For example, by using UL MU OFDMA techniques during a given UL time interval, multiple STAs 108 may transmit UL MU PPDUs to the AP 104 via different respective OFDMA Resource Units (RUs) allocated by the AP 104. In another example, by using UL MU-MIMO techniques during a given UL time interval, multiple STAs 108 may transmit UL MU PPDUs to the AP 104 via different respective spatial streams allocated by the AP 104.

To manage access, the AP 104 may transmit a master-sync transmission, which may be a Trigger Frame (TF) or a control and schedule transmission, at the beginning of the control period. The AP 104 may transmit a time duration of the TXOP and sub-channel information. During the control period, STAs 108 may communicate with the AP 104 in accordance with a non-contention based multiple access technique, such as OFDMA or MU-MIMO. This technique is unlike conventional WLAN communications in which devices communicate in accordance with a contention-based communication technique, rather than a multiple access technique. During the control period, the AP 104 may communicate with STAs 108 using one or more control frames, and the STAs 108 may operate on a sub-channel smaller than the operating range of the AP 104.

During the master-sync transmission, the STAs 108 may contend for the wireless medium with the legacy devices 108 being excluded from contending for the wireless medium during the master-sync transmission. The TF used during this master-sync transmission may indicate an UL-MU-MIMO and/or UL OFDMA control period. The multiple-access technique used during the control period may be a scheduled OFDMA technique, or alternatively, may be a TDMA technique, a Frequency Division Multiple Access (FDMA) technique, or a SDMA technique.

Similarly, STAs 108, in the WLAN of environment 100, may need to receive data. Again, rather than scheduling medium access for STAs 108 in different respective DL time intervals, the AP 104 may schedule medium access for STAs 108 to support DL MU transmission techniques, according to which multiple STAs 108 may receive DL MU PPDUs from the AP 104 simultaneously during a given DL time interval. For example, by using DL MU OFDMA techniques during a given UL time interval, multiple STAs 108 may receive DL MU PPDUs from the AP 104 via different respective OFDMA RUs allocated by the AP 104. In another example, by using DL MU-MIMO techniques during a given DL time interval, multiple STAs 108 may receive DL MU PPDUs from the AP 104 via different respective spatial streams allocated by the AP 104.

To manage access, the AP 104 may transmit a master-sync transmission, which may be a TF or a control and schedule reception, at the beginning of the control period. The AP 104 may transmit a time duration of the Receive Opportunity (RXOP) and sub-channel information. During the control period, STAs 108 may communicate with the AP 104 in accordance with a non-contention based multiple access technique, such as OFDMA or MU-MIMO. During the control period, the AP 104 may communicate with STAs 108 using one or more control frames, and the STAs 108 may operate on a sub-channel smaller than the operating range of the AP 104.

During the master-sync transmission, the STAs 108 may contend for the wireless medium with the legacy devices 108 being excluded from contending for the wireless medium during the master-sync transmission. The TF used during this master-sync transmission may indicate an UL-MU-MIMO and/or UL OFDMA control period. The multiple-access technique used during the control period may be a scheduled OFDMA technique, or alternatively, may be a TDMA technique, FDMA technique, or a SDMA technique.

The AP 104 may also communicate with legacy STAs and/or non-legacy STAs 108 in accordance with legacy IEEE 802.11 communication techniques. In some configurations, the AP 104 may also be configurable to communicate with STAs 108 outside the control period in accordance with legacy IEEE 802.11 communication techniques, although this is not a requirement.

Further, the one or more client STAs 108 may be one or more devices that provide a visual rendering of the virtual reality or augmented reality scene or session. Client STAs 108 can also receive inputs from users that change the VR/AR scene. These inputs may be communicated up through the AP 104, through the controller 101, to the VR/AR server 116. Further, the STAs 108 may also communicate updates amongst the STAs 108 without communicating through the VR/AR server 116. The VR/AR server 116 may update the virtual reality session and scene and send those changes to the controller 101, the AP 104, and back to the client STAs 108.

Controller 101 may be operable to manage the configuration and communications infrastructure of the one or more APs 104 within the environment 100. This control includes managing uplink and downlink data transmissions form one or more APs 104 to the STAs 108.

The controller of the SDN 112 can manage a network, based on software components, within the client STA 108, AP 104, controller 101, and/or the VR/AR server 116. Thus, each one of the hardware components may execute one or more SDN modules and function as a virtual network amongst these different hardware devices. As such, the controller of the SDN 112 may be operable to function to communicate amongst the various different software components and be managed or guided by the controller of the SDN 112.

Figure 2A:
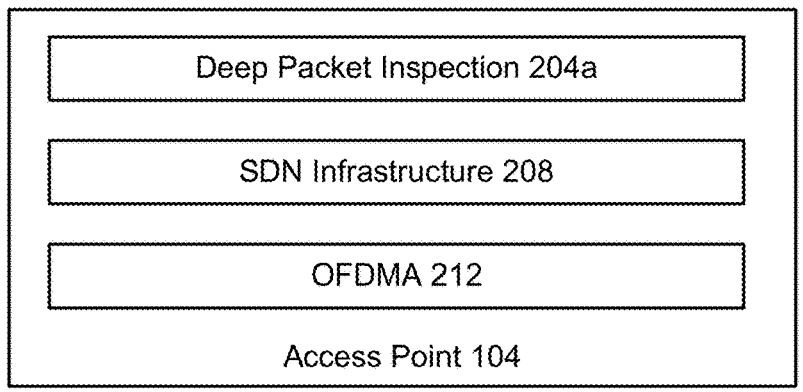
FIG. 2A illustrates an access point in accordance with aspects of the current disclosure.
Figure 2B:
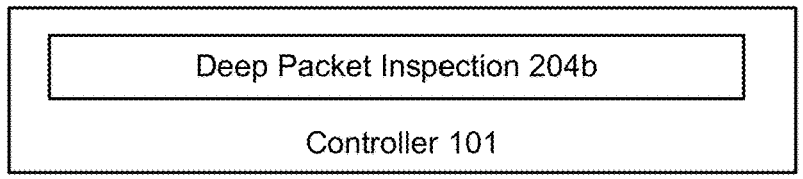
FIG. 2B illustrates a controller in accordance with aspects of the current disclosure.
Figure 2C:
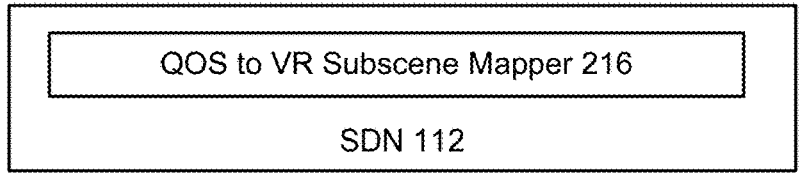
FIG. 2C illustrates a Software Defined Network (SDN) in accordance with aspects of the current disclosure.
Figure 2D:
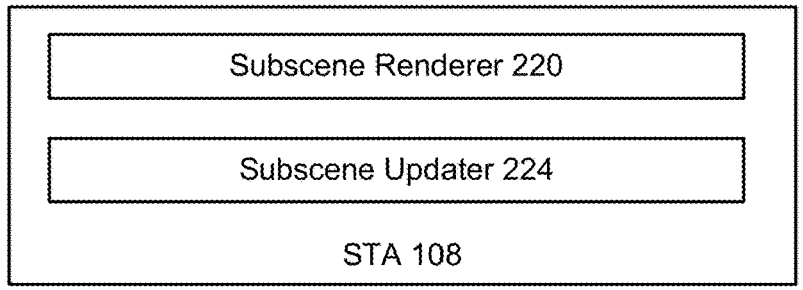
FIG. 2D illustrates a Station (STA) in accordance with aspects of the current disclosure.

Embodiments of the various components, as described in conjunction with FIG. 1, may be shown in FIGS. 2A through 2D. The different components 200 can include an AP 104, as shown in FIG. 2A, a controller 101, as shown in FIG. 2B, a server of the SDN 112, as shown in FIG. 2C, and/or a STA 108, as shown in FIG. 2D.

The AP 104 can include one or more of, but is not limited to, a Deep Packet Inspection (DPI) component 204, an SDN infrastructure component 208, and an OFDMA scheduler 212. The DPI component 204 can inspect communications, to or from the client STAs 108, looking for data that may be associated with VR traffic. The data being reviewed or being inspected may be as described in conjunction with FIG. 4A. This DPI component 204 may determine what type of data is related to VR environments and store that information for identifying future packets being sent between the STAs 108 and the AP 104.

The SDN infrastructure component 208 can be an interface to a controller of the SDN 112 to obtain information that describes data transmissions that may be associated with the VR environment. Thus, the AP 104 can receive one or more items of information, such as QoS information that can be mapped to VR information, from the controller of the SDN 112, as described in conjunction with FIG. 3. The information from the SDN controller may also be as described in conjunction with FIG. 4A.

The OFDMA component 212 can schedule one or more RUs to the different STAs 108. Here, the OFDMA scheduler 212 can receive information from the DPI component 204 to identify download transmissions and/or upload transmissions associated with the VR/AR environment. If an uplink or downlink transmission is related to the VR system, the OFDMA component 212 can manage the resource units to ensure concurrent transmission of data packets to the client STAs 108*a*, 108*b*. As such, the client STAs 108*a*, 108*b* can receive scene updates for the virtual reality environment simultaneously, contemporaneously, or concurrently.

An embodiment of the controller 101 may be as shown in FIG. 2B. The controller 101 can include at least a DPI component 204. The deep packet inspection component of the controller 101 may be the same or similar to the DPI component 204, as described in conjunction with the AP 104 in FIG. 2A. As such, the DPI component 204 of the controller 101 as shown in FIG. 2B need not be explained further here.

An embodiment of the SDN sever 112 may be as shown in FIG. 2C The server controller of the SDN 112 can include one or more of, but is not limited to, QOS to VR subscene mapper 216. The QOS to VR subscene mapper 216 can match QOS parameters to VR subscenes as understood by the SDN controller. The controller of the SDN 112 may have the ability to determine or identify VR scene packets being transmitted through the SDN in the environment 100. When a VR scene update or other type of transmission is received by the controller of the SDN 112, the element data may be mapped to QOS information and then this information may be provided to the AP 104. The information from the SDN controller can also be used to identify VR scene elements at the AP 104 as described in conjunction with FIG. 2A.

The components of a STA 108 may be as shown in FIG. 2D. The STA 108 can include one or more of, but is not limited to, a subscene renderer 220 and a subscene updater 224. This subscene renderer 220 can receive a downlink transmission of scene updates for the VR environment and render those for display at the STA 108. As such, the subscene renderer 220 can provide the output to the user of the VR display.

The subscene updater 224 can receive updates or interactions of the user through the user interface into the VR environment. Any type of interaction may be registered as a scene update that may be sent by the subscene updater 224 to the AP 104 and then on to the VR/AR server 116. In this way, the STA 108 can both receive and send modifications to the VR scene elements.

Figure 3:
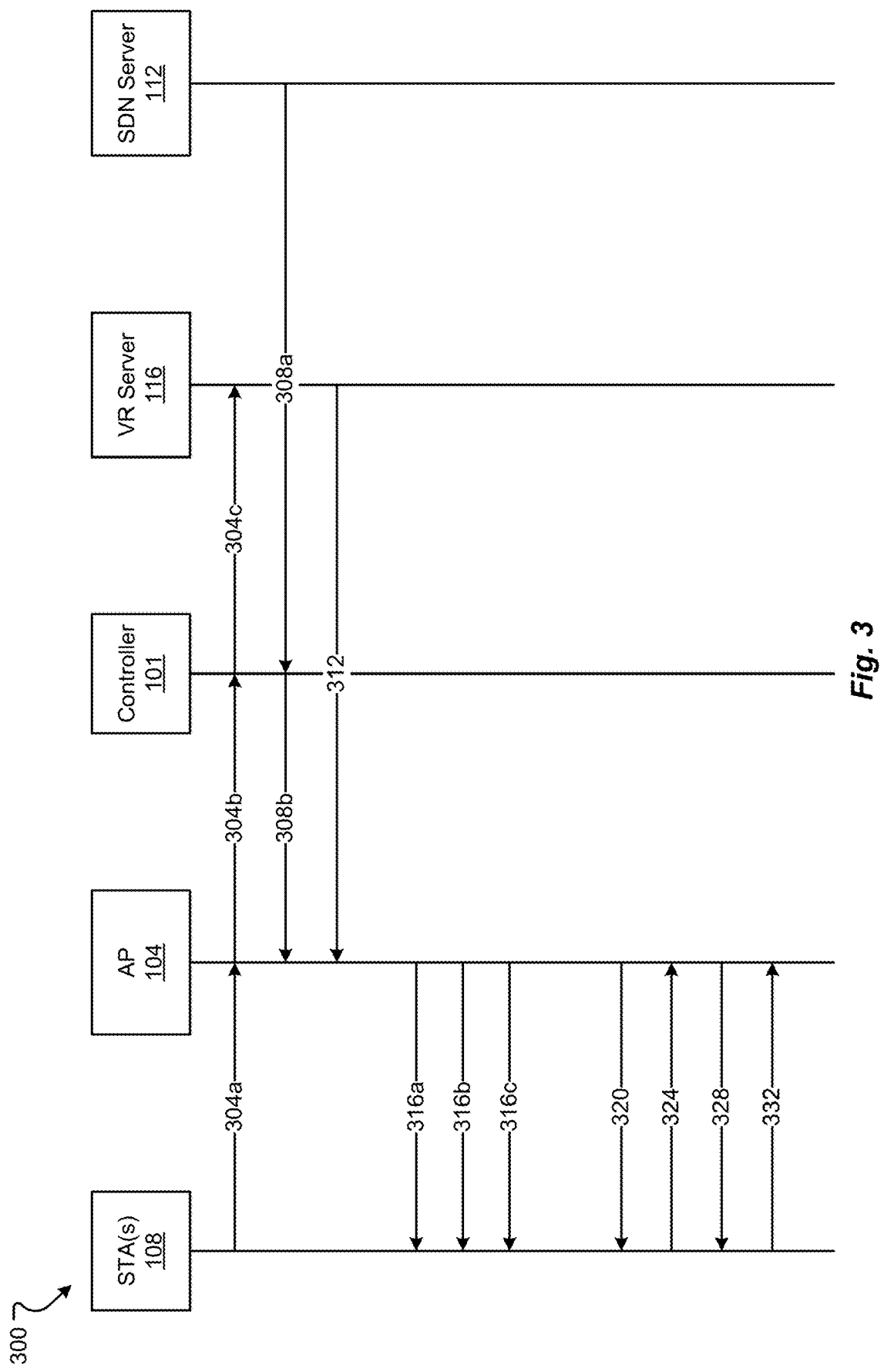
FIG. 3 illustrates a signaling process in accordance with aspects of the current disclosure.

An embodiment of a signaling process 300 may be as shown in FIG. 3. The communications may be between the STA 108, the AP 104, the controller 101, the VR/AR server 116, and/or the controller of the SDN 112. These signals may be sent by various interfaces and communicated wirelessly or through wired connection by one or more hardware and/or software components as described in conjunction with FIG. 6.

In a first communication, a STA 108 can send a scene update 304*a* to the AP 104. The scene update can be some type of update or change to the VR scene being viewed by the client STAs 108. The scene update may have various different types of metadata associated therewith, as described in conjunction with FIG. 4A. The AP 104 may be able to identify such information and store information about what may constitute a VR transmission. The AP 104 may then forward that information to the controller 101 where the DPI component 204*b* of the controller 101 may also identify VR elements similar to the DPI component 204*a* of the AP 104. The controller 101 can also store any information gleaned about data about this packet to identify future packets as VR elements. The transmission may then be relayed from the controller 101 to the VR/AR server 116 as signal 304*c*.

The server of the SDN 112 may also receive any type of scene updates at the SDN system. These updates may be received by the SDN server and determined or relayed from the SDN server on to the VR/AR server 116. The SDN server may also glean information about the packets being sent and send that information to the controller 101, as signal 308*a*, or to the AP 104, as signal 308*b*. The signals 308 may include a QOS to VR mapping, as described in conjunction with FIG. 2C.

After receiving a client input in signal 304, the VR/AR server 116 may update the scene elements and send a transmission with that updated scene element data, in signal 312. The AP 104 may then extract or use the information gleaned about what is a VR signal (from previous VR/AR transmissions) to determine that the scene update, in signal 312, may be bound for one or more different client STAs 108 and that those scene elements should be received contemporaneously.

Then, the scene update information, in signal 312, may then be scheduled for separate RUs, by the OFDMA scheduler 212, to be sent concurrently as signals 316*a*, 316*b*, 316*c* to the various STAs 108. In this way, the STAs 108 can receive the scene updates contemporaneously or near simultaneously. With this type of infrastructure, the STAs 108 are able to view the same material at the same time, which makes interacting with the VR elements, in a group setting, more effective.

The AP 104 may also send a poll, in signal 320, for any type of scene update that may be needed to be sent by one or more of the STAs 108. The poll, in signal 320, may be responded to by the STA 108, in a scene update, in signal 324. Here, the scene update, in signal 324, can indicate that the STA 108 has updates for the scene elements. If there is an update, the AP 104 may then send a trigger frame to schedule this update, in signal 328. The trigger frame, in signal 328, may have information that allows the STA 108 to send the scene update to the AP 104, which will then forward that signal to the VR/AR server 116. The STA 108 may then respond to the trigger frame, in signal 328, with an uplink OFDMA signal carrying the scene update data, in signal 332. Here, the STA 108 is producing a scene element update that can be sent on to the VR/AR server 116 and then provided to the various other devices as a scene update, as explained above.

Figure 4A:
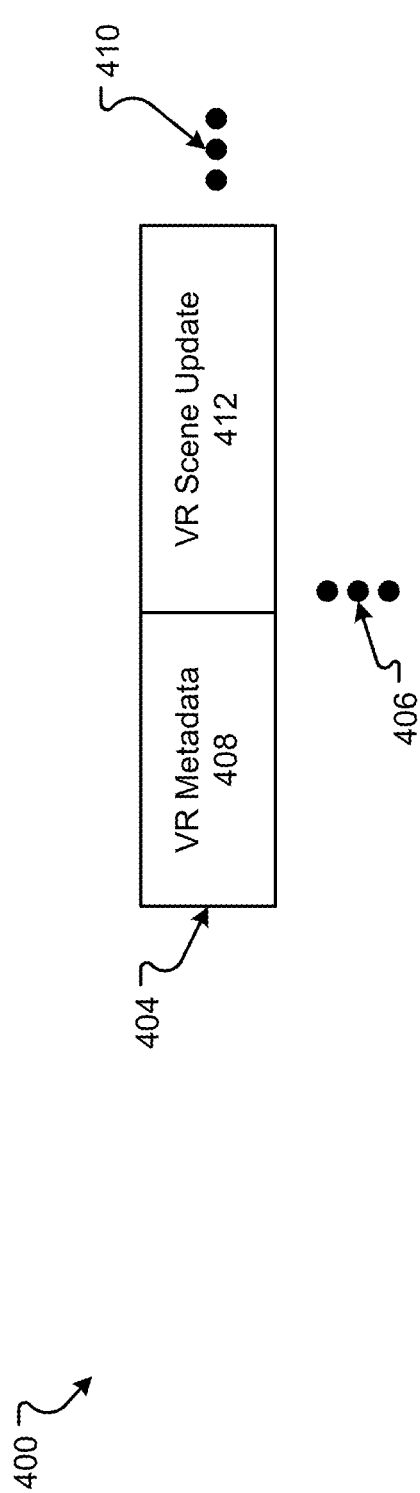
FIG. 4A illustrates data structure that may be received, stored, retrieved, managed, etc., in accordance with aspects of the current disclosure.
Figure 4B:
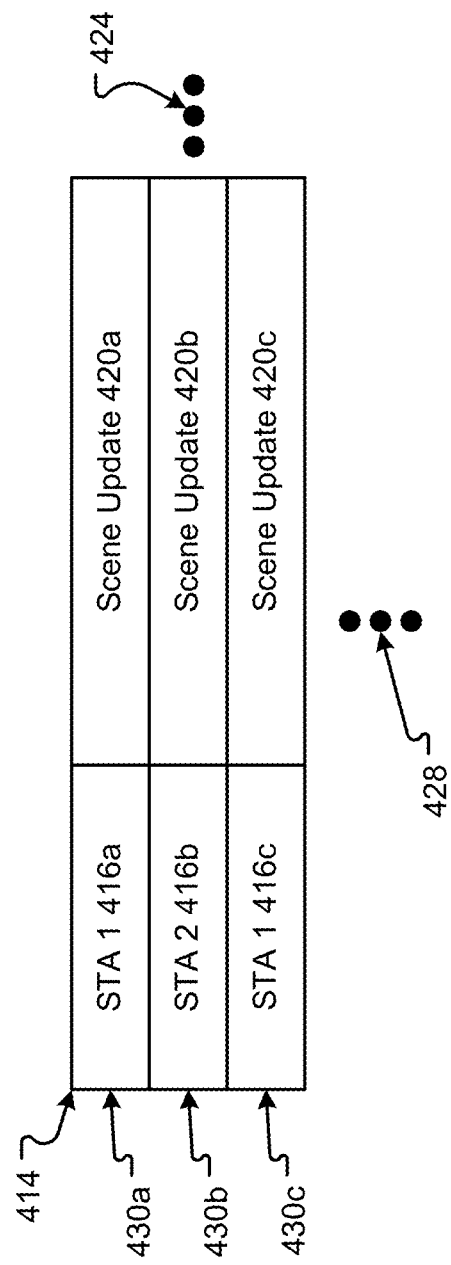
FIG. 4B illustrates another data structure that may be received, stored, retrieved, managed, etc., in accordance with aspects of the current disclosure.

An embodiment of data structures 400 that may be stored, retrieved, sent, received, or managed by the various components as shown in FIG. 1 may be provided in FIGS. 4A and 4B. Data structure 404, as shown in FIG. 4A, can be a signal sent from a STA 108 to a VR/AR server 116 including scene update data or a scene update from the VR/AR server 116 sent to one or more STAs 108. In other configurations, the data structure 404 can represent signals sent by the SDN infrastructure. The data structure 404 can include one or more of, but is not limited to, VR metadata 408 and/or information associated with a virtual reality scene update 412. There may be more or fewer fields than that shown FIG. 4A, as represented by ellipses 410. Further, for each different type of scene update received or generated by client STA 108, there may be another data structure, as represented by ellipses 406.

VR metadata 408 can include any information about the VR scene update that doesn't actually include the data for that update. As such, the VR metadata can include IDs, timing information, names of receivers or senders, can identify the scene element or other data within the video or VR stream, or other information. For example, the metadata can include a packet destination (target client) and tag profile (e.g. TagName=TouchSensor, Namespace=3D, objectID=555, size=2 2 2). In other configurations, the metadata may be the safAU.streamID field, in LASeR. In BIFS, the VR metadata 408 can include the different X3D "component" tags. With SDN, the VR metadata 408 can represent L2 or L3 QoS tag(s), for example, the "flow label" field in the IPv6 header. This updated VR metadata 408 may be scanned by the DPI component 204 to look for identifying materials stored within such VR metadata 408.

The VR scene update 412 can include the change to the VR subscene element as produced by the STA 108 or the VR/AR server 116. The scene update information can be, for example information, about an object that's moved, information about an object that is no longer visible, can include the introduction of an element, or can have other various effects or changes in the data stream for the VR environment.

An OFDMA schedule 414 may be as shown in FIG. 4B. Here, each of the various STAs 108 may have a resource unit 430a, 430b, 430c associated therewith. Each resource unit 430 may have a STA ID 416 and a scene update 420. The scene update 420 may be the same for the different VR client STAs 108. However, each of these scene updates 420 may be sent concurrently in an OFDMA block 414. Each STA 108 can recognize which of the scene updates 420 are associated with the AP 104 by looking for the identifier 416 in the OFDMA block or listening on the RU 430 as schedule in a trigger frame. There may be more or fewer fields not shown in data structure 414 in FIG. 4B, as represented by ellipses 424. Each of the different data transmissions may include a different OFDMA block 414 and assignments therein, as represented by ellipses 428.

Figure 5:
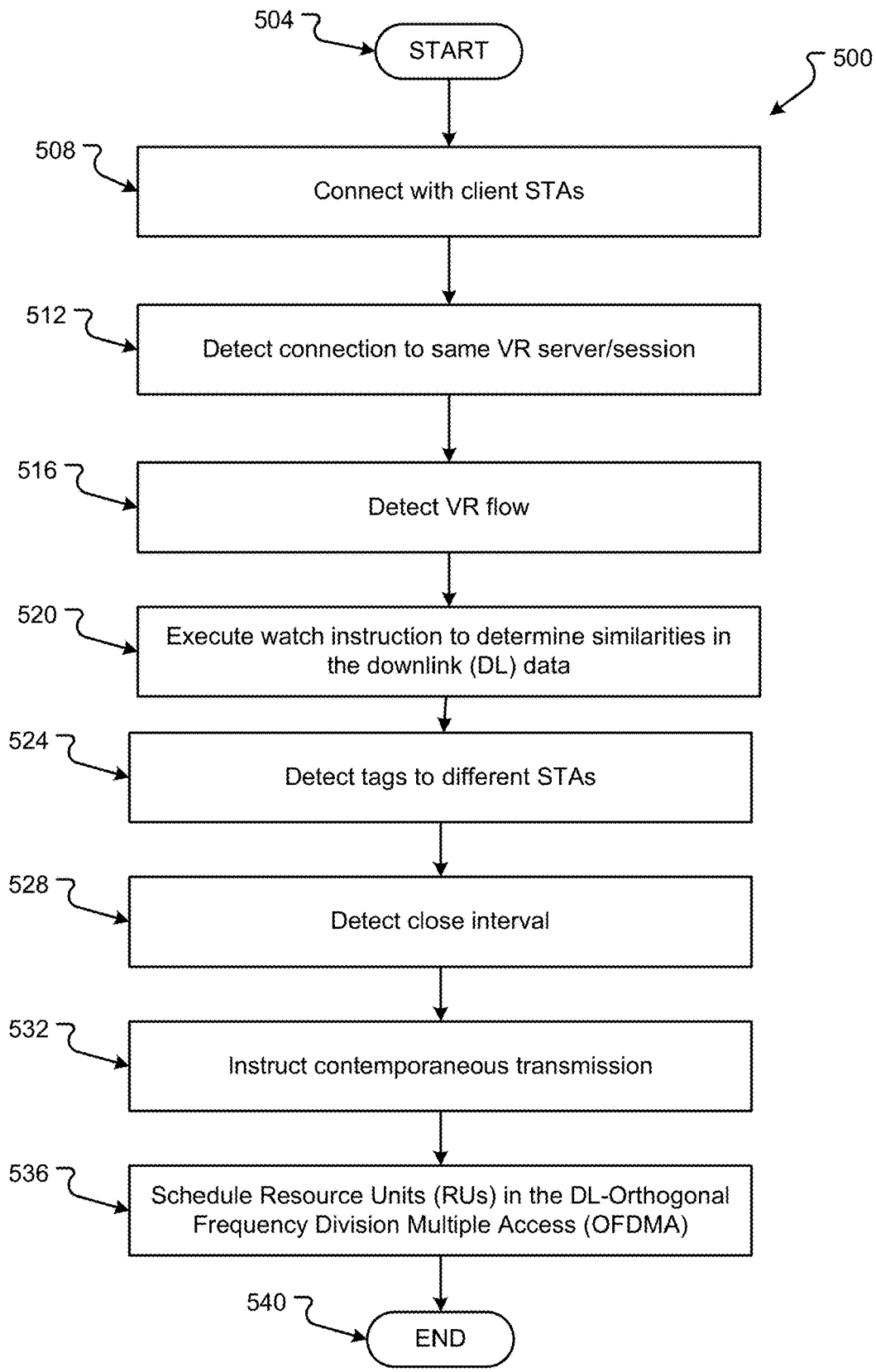
FIG. 5 illustrates a process for managing VR/AR scene updates in accordance with aspects of the current disclosure.

A method for contemporaneously sending VR scene elements, with an AP 104, may be as shown in FIG. 5. The method 500 may be as executed by the AP 104 in sending information to or from the STAs 108 and/or controller 101. Generally, the method 500 starts with a start operation 504 and ends with an end operation 540. The method 500 can include more or fewer stages or can arrange the order of the stages differently than those shown in FIG. 5. The method 500 can be executed as a set of computer-executable instructions, executed by a computer system or processing component, and be encoded or stored on a storage medium. Further, the method 500 can be executed by a gate or other hardware device or component in an ASIC, a FPGA, or other type of hardware device. Hereinafter, the method 500 shall be explained with reference to the systems, components, modules, software, data structures, etc. described herein.

The AP 104 can connect with one or more client STAs 108, in stage 508. Here, the connection may be a wireless link or association between the client STA 108 and the AP 104, in the BSS 102. The association can include an exchange of information, such as IDs and other information, such that the AP 104 can communicate with the client STAs 108.

The AP 104 and/or controller 101 may launch a watch function of a DPI component 204a to detect a connection to the same VR/AR server 116, by the two or more client STAs 108, in stage 512. AP 104 can use the DPI component 204 to detect information, e.g., in the VR metadata 408, within packet sent between the client STA 108 and the VR/AR server 116. This DPI component 204 can detect a connection to the VR/AR server 116, by the client STAs 108. The connection can be an association, a use of a standard or protocol for VR systems, or other information understood by the AP 104 as a connection to the VR/AR server 116.

The AP 104 may then detect communications or a virtual reality flow of data to and from the VR/AR server 116 from the client STAs 108, in stage 516. Here, the AP 104 can detect packets being sent to and from the VR/AR server 116 by detecting the ID of the VR/AR server 116 and the packets. The AP 104 may execute the watch instruction of the DPI component 204 to determine similarities in downlink data from the VR/AR server 116 to client STAs 108 for the VR flow, in stage 520.

The DPI component 204 can look for information that can identify data as VR scene updates, as described in conjunction with FIG. 4A and above. As such, the AP is looking for similarities in signal 312 from the VR/AR server 116 sent to the AP 104 then relayed to the client STAs 108. In other situations, the AP 104 can receive QOS to VR scene mapping information from the controller of the SDN 112. The QOS information may then be reviewed to find similarities in the downlink data.

From the similarities, the DPI component 204 can detect tags or attributes in the VR metadata 408 to the different STAs 108, in stage 524. Thus, new data, in signal 312, having the similar tags or identifying information representing VR scene updates, can be indicated or found by the DPI component 204.

The AP 104 then can detect a close interval between two or more VR packets sent to the different client STAs 108. A close interval may be predetermined and set by the AP 104. For example, the close interval can be 50 milliseconds or less. In other configurations, the close interval can be any that is below human time perception abilities. These close interval packets can be understood to be needed contemporaneously by the client STAs 108a, 108b to receive scene updates near simultaneously or contemporaneously.

If the close interval is detected by the AP, in stage 528, then the OFDMA scheduler 212 can instruct a contemporaneous transmission of those packets, in stage 532. Here, the OFDMA scheduler 212 can assign resources units 430 for the client STAs 108a, 108b such that the STAs 108a, 108b can receive the packets contemporaneously in the same OFDMA block 414. In this way, all client STAs 108, in the same VR scene, can receive the updates near simultaneously or concurrently so that the clients or the users appear to view the same changes to the content at the same time.

The OFDMA scheduler 212 can then schedule resource units 430, in the downlink OFDMA transmissions 414 that allow for contemporaneous receipt of the information by the client STAs 108. In other words, the timing and special information about the VR signals allows for the RUs 430 to be received or data received in the RUs 430 near simultaneously by the different STAs 108.

Figure 6:
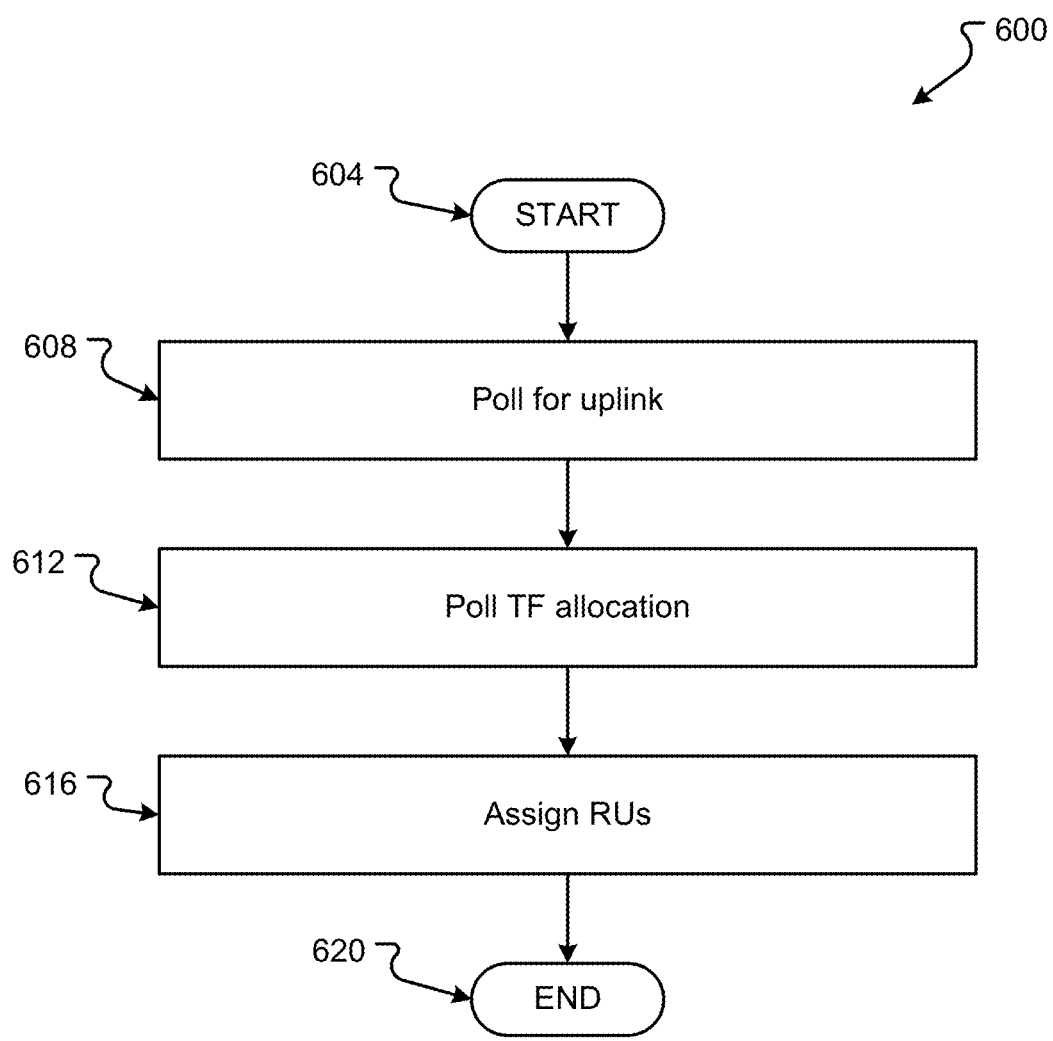
FIG. 6 illustrates another process for managing VR/AR scene updates in accordance with aspects of the current disclosure.

An embodiment of a method 600 for allocating or use for uplink transmissions may be as shown in conjunction with FIG. 6. Generally, the method 600 starts with a start operation 604 and ends with an end operation 620. The method 600 can include more or fewer stages or can arrange the order of the stages differently than those shown in FIG. 6. The method 600 can be executed as a set of computer-executable instructions, executed by a computer system or processing component, and be encoded or stored on a storage medium. Further, the method 600 can be executed by a gate or other hardware device or component in an ASIC, a FPGA, or other type of hardware device. Hereinafter, the method 600 shall be explained with reference to the systems, components, modules, software, data structures, etc. described herein.

The OFDMA scheduler 212 can poll STAs 108 for uplink data, in stage 608. Here, the OFDMA scheduler 212 can request of the STAs 108 if uplink data or scene updates are needed to be sent to the VR/AR server 116. This poll may be in signal 320 to the STAs 108. If a scene update is needed, the STA 108 sends a scene update indicator, in signal 324, to the AP 104.

When a scene update needs to be sent from the STA 108 to the VR/AR server 116, the AP 104 may send a trigger frame, in signal 328, that allocates a resource unit 430 or other information to the STA 108 that replied to the polling, in stage 612. This trigger frame, in signal 328, can assign the resource unit 430, in stage 616. The trigger frame, in signal 328, indicates what information is needed by the STA 108 to send the uplink data in assigned resource unit 430. The STA 108 then places the VR scene update information in the RU 430 in the OFDMA transmission, in signal 332, back to the AP 104. This OFDMA transmission, in signal 332, may then be forwarded, as signal 304b to the VR/AR server 116, in signal 304c.

FIG. 7 illustrates an embodiment of a communications device 700 that may implement one or more of APs 104, controllers 101, and/or STAs 108 of FIG. 1. In various embodiments, device 700 may comprise a logic circuit. The logic circuit may include physical circuits to perform operations described for one or more of APs 104, controllers 101, and STAs of FIG. 1, for example. As shown in FIG. 7, device 700 may include one or more of, but is not limited to, a radio interface 705, baseband circuitry 725, and/or computing platform 745.

The device 700 may implement some or all of the structures and/or operations for one or more of APs 104, controllers 101, and/or STAs 108 of FIG. 1, storage medium 755, and logic circuit in a single computing entity, such as entirely within a single device. Alternatively, the device 700 may distribute portions of the structure and/or operations using a distributed system architecture, such as a client-server architecture, a peer-to-peer architecture, a master-slave architecture, etc.

A radio interface 705, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-air interface or modulation scheme. The radio interface 705 may include, for example, a receiver 710 and/or a transmitter 715. Radio interface 705 may include bias controls, a crystal oscillator, and/or one or more antennas 720. In additional or alternative configurations, the radio interface 705 may use oscillators and/or one or more filters, as desired.

Baseband circuitry 725 may communicate with radio interface 705 to process, receive, and/or transmit signals and may include, for example, an Analog-To-Digital Converter (ADC) for down converting received signals with a Digital-To-Analog Converter (DAC) 730 for up converting signals for transmission. Further, baseband circuitry 725 may include a baseband or Physical layer (PHY) processing circuit for the PHY link layer processing of respective receive/transmit signals. Baseband circuitry 725 may include, for example, a Medium Access Control (MAC) processing circuit 735 for MAC/data link layer processing. Baseband circuitry 725 may include a memory controller for communicating with MAC processing circuit 735 and/or a computing platform 745, for example, via one or more interfaces 740.

In some configurations, PHY processing circuit may include a frame construction and/or detection module, in combination with additional circuitry such as a buffer memory, to construct and/or deconstruct communication frames. Alternatively or in addition, MAC processing circuit 735 may share processing for certain of these functions or perform these processes independent of PHY processing circuit. In some configurations, MAC and PHY processing may be integrated into a single circuit.

The computing platform 745 may provide computing functionality for the device 700. As shown, the computing platform 745 may include a processing component 750. In addition to, or alternatively of, the baseband circuitry 725, the device 700 may execute processing operations or logic for one or more of APs 104, controllers 101, and/or STAs 108, storage medium 755, and logic circuits using the memory components 755. The processing component 750 (and/or PHY and/or MAC 735) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, Application Program Interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 745 may further include other platform components. Other platform components include common computing elements, such as one or more processors, multi-core processors, co-processors, memory units, chipsets, controllers, peripherals, interfaces, oscillators, timing devices, video cards, audio cards, multimedia Input/Output (I/O) components (e.g., digital displays), power supplies, and so forth. Examples of memory units 755 may include without limitation various types of computer readable and machine readable storage media in the form of one or more higher speed memory units, such as Read-Only Memory (ROM), Random-Access Memory (RAM), Dynamic RAM (DRAM), Double-Data-Rate DRAM (DDRAM), Synchronous DRAM (SDRAM), Static RAM (SRAM), Programmable ROM (PROM), Erasable Programmable ROM (EPROM), Electrically Erasable Programmable ROM (EEPROM), flash memory, polymer memory such as ferroelectric polymer memory, ovonic memory, phase change or ferroelectric memory, Silicon-Oxide-Nitride-Oxide-Silicon (SONOS) memory, magnetic or optical cards, an array of devices such as Redundant Array of Independent Disks (RAID) drives, solid state memory devices, Universal Serial Bus (USB) memory, Solid State Drives (SSD) and any other type of storage media suitable for storing information.

Device 700 may be, for example, an ultra-mobile device, a mobile device, a fixed device, a Machine-To-Machine (M2M) device, a Personal Digital Assistant (PDA), a mobile computing device, a smart phone, a telephone, a digital telephone, a cellular telephone, user equipment, eBook readers, a handset, a one-way pager, a two-way pager, a messaging device, a computer, a Personal Computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired.

Embodiments of device 700 may be implemented using Single Input Single Output (SISO) architectures. However, certain implementations may include multiple antennas (e.g., antennas 720) for transmission and/or reception using adaptive antenna techniques for beamforming or Spatial Division Multiple Access (SDMA) and/or using MIMO communication techniques.

The components and features of device 700 may be implemented using any combination of discrete circuitry, Application Specific Integrated Circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware, and/or software elements may be collectively or individually referred to herein as "logic," "circuit," or "processor."

The device in FIG. 7 can also contain a security module (not shown). This security module can contain information regarding, but not limited to, security parameters required to connect the device to another device or other available networks or network devices, and can include Wireless Equivalent Privacy (WEP) or Wi-Fi Protected Access (WPA) security access keys, network keys, etc., as discussed.

Another module that the device in FIG. 7 can include is a network access unit (not shown). The network access unit can be used for connecting with another network device. In one example, connectivity can include synchronization between devices. In another example, the network access unit can work as a medium which provides support for communication with other stations. In yet another example, the network access unit can work in conjunction with at least the MAC circuitry 735. The network access unit can also work and interact with one or more of the modules/components described herein.

It should be appreciated that the exemplary device 700 shown in the block diagram of FIG. 7 may represent one functionally descriptive example of many potential implementations. Accordingly, division, omission, or inclusion of block functions depicted in the accompanying figures does not infer that the hardware components, circuits, software and/or elements for implementing these functions would be necessarily be divided, omitted, or included in embodiments.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of the device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Aspects herein comprise a method comprising: identifying, by an access point (AP), information in a first data packet that is associated with a Virtual Reality (VR) session; identifying, by the AP, the information in a second data packet, addressed to a first Station (STA), and in a third data packet, addressed to a second STA; determining, by the AP, that the second data packet and the third data packet are also associated with the VR session; scheduling a first resource unit, in a transmission to the first STA and second STA, to include the second data packet; and scheduling a second resource unit, in the transmission, to include the third data packet.

Any of the one or more above aspects, wherein the AP identifies the information by a deep packet inspection process.

Any of the one or more above aspects, wherein the AP receives the second data packet and the third data packet within a time interval.

Any of the one or more above aspects, wherein the time interval is below a predetermined threshold.

Any of the one or more above aspects, wherein the predetermined threshold is less than a human's ability of perception.

Any of the one or more above aspects, wherein the transmission is sent wirelessly to the first STA and the second STA.

Any of the one or more above aspects, wherein the transmission sends the second data packet and third data packet contemporaneously.

Any of the one or more above aspects, wherein the second data packet is encrypted.

Any of the one or more above aspects, wherein at least a part of the information is Quality of Service information that the AP receives from a Software Defined Network (SDN) server.

Any of the one or more above aspects, wherein the information comprises a QoS tag, a safAU.streamID, or an X3D tag.

Aspects herein further comprise an access point (AP) comprising: a radio operable to send or receive one or more signals to or from two or more Stations (STAs); a memory; a processor in communication with the memory and the radio, the processor operable to: receive a first data packet; identify metadata in the first data packet that is associated with a Virtual Reality (VR) session; identify the metadata in a second data packet addressed to a first STA; identify the metadata in a third data packet addressed to a second STA; determine that the second data packet is also associated with the VR session; determine that the third data packet is also associated with the VR session; determine that the second data packet and the third data packet are received within a predetermined time interval; schedule a first resource unit, in a Orthogonal Frequency Division Multiple Access (OFDMA) transmission to the first STA and second STA, to include the second data packet; schedule a second resource unit, in the OFDMA transmission, to include the third data packet; and wirelessly send the OFDMA transmission to the first STA and the second STA.

Any of the one or more above aspects, wherein the AP identifies the metadata by a deep packet inspection process.

Any of the one or more above aspects, wherein the predetermined time interval is less than a human's ability of perception.

Any of the one or more above aspects, wherein the OFDMA transmission sends the second data packet and third data packet contemporaneously.

Any of the one or more above aspects, wherein the metadata comprises a QoS tag, a safAU.streamID, or an X3D tag.

Aspects herein further comprise a basic service set comprising: a first access point operable to: receive a first data packet; identify metadata in the first data packet that is associated with a Virtual Reality (VR) session; identify the metadata in a second data packet addressed to a first STA, wherein the second data packet comprises a VR scene update; identify the metadata in a third data packet addressed to a second STA, wherein the third data packet also comprises the VR scene update; determine that the second data packet is also associated with the VR session; determine that the third data packet is also associated with the VR session; determine that the second data packet and the third data packet are received within a predetermined time interval; schedule a first resource unit, in a Orthogonal Frequency Division Multiple Access (OFDMA) transmission to the first STA and second STA, to include the second data packet; schedule a second resource unit, in the OFDMA transmission, to include the third data packet; and wirelessly send the OFDMA transmission to the first STA and the second STA; the first STA operable to: wirelessly receive the OFDMA transmission; and update a first VR scene, displayed in a first user interface of the first STA, with the VR scene update; the second STA operable to: wirelessly receive the OFDMA transmission; and contemporaneously with the update of the first VR scene, update a second VR scene, displayed in a second user interface of the second STA, with the VR scene update.

Any of the one or more above aspects, wherein the AP identifies the metadata by a deep packet inspection process.

Any of the one or more above aspects, wherein the predetermined time interval is less than a human's ability of perception.

Any of the one or more above aspects, wherein the OFDMA transmission sends the second data packet and third data packet contemporaneously.

Any of the one or more above aspects, wherein the metadata comprises a QoS tag, a safAU.streamID, or an X3D tag.

What is claimed is:

1. A method comprising:
    identifying, by an access point (AP), information in a first data packet that is associated with a Virtual Reality (VR) session;
    identifying, by the AP, the information in a second data packet, addressed to a first Station (STA), and in a third data packet, addressed to a second STA;
    determining, by the AP, that the second data packet and the third data packet are also associated with the VR session;
    scheduling a first resource unit, in a transmission to the first STA and the second STA, to include the second data packet; and
    scheduling a second resource unit, in the transmission, to include the third data packet.

2. The method of claim 1, wherein the AP identifies the information by a deep packet inspection process.

3. The method of claim 2, wherein the AP receives the second data packet and the third data packet within a time interval.

4. The method of claim 3, wherein the time interval is below a predetermined threshold.

5. The method of claim 4, wherein the predetermined threshold is less than a human's ability of perception.

6. The method of claim 5, wherein the transmission is sent wirelessly to the first STA and the second STA.

7. The method of claim 6, wherein the transmission sends the second data packet and the third data packet contemporaneously.

8. The method of claim 7, wherein the second data packet is encrypted.

9. The method of claim 8, wherein at least a part of the information is Quality of Service information that the AP receives from a Software Defined Network (SDN) server.

10. The method of claim 1, wherein the information comprises a QoS tag, a safAU.streamID, or an X3D tag.

11. A Access Point (AP) comprising:
    a radio configured to send or receive one or more signals to or from two or more Stations (STAs);
    a memory;
    a processor in communication with the memory and the radio, the processor configured to:
        receive a first data packet;
        identify metadata in the first data packet that is associated with a Virtual Reality (VR) session;
        identify the metadata in a second data packet addressed to a first STA;
        identify the metadata in a third data packet addressed to a second STA;
        determine that the second data packet is also associated with the VR session;
        determine that the third data packet is also associated with the VR session;
        determine that the second data packet and the third data packet are received within a predetermined time interval;
        schedule a first resource unit, in an Orthogonal Frequency Division Multiple Access (OFDMA) transmission to the first STA and the second STA, to include the second data packet;
        schedule a second resource unit, in the OFDMA transmission, to include the third data packet; and
        wirelessly send the OFDMA transmission to the first STA and the second STA.

12. The AP of claim 11, wherein the AP identifies the metadata by a deep packet inspection process.

13. The AP of claim 11, wherein the predetermined time interval is less than a human's ability of perception.

14. The AP of claim 11, wherein the OFDMA transmission sends the second data packet and third data packet contemporaneously.

15. The AP of claim 11, wherein the metadata comprises a QoS tag, a safAU.streamID, or an X3D tag.

16. A basic service set comprising:
    a first Access Point (AP) configured to:
        receive a first data packet;
        identify metadata in the first data packet that is associated with a Virtual Reality (VR) session;
        identify the metadata in a second data packet addressed to a first STA, wherein the second data packet comprises a VR scene update;
        identify the metadata in a third data packet addressed to a second STA, wherein the third data packet also comprises the VR scene update;
        determine that the second data packet is also associated with the VR session;
        determine that the third data packet is also associated with the VR session;

determine that the second data packet and the third data packet are received within a predetermined time interval;

schedule a first resource unit, in an Orthogonal Frequency Division Multiple Access (OFDMA) transmission to the first STA and second STA, to include the second data packet;

schedule a second resource unit, in the OFDMA transmission, to include the third data packet; and wirelessly send the OFDMA transmission to the first STA and the second STA;

the first STA configured to:

wirelessly receive the OFDMA transmission; and update a first VR scene, displayed in a first user interface of the first STA, with the VR scene update;

the second STA configured to:

wirelessly receive the OFDMA transmission; and contemporaneously with the update of the first VR scene, update a second VR scene, displayed in a second user interface of the second STA, with the VR scene update.

17. The basic service set of claim 16, wherein the first AP identifies the metadata by a deep packet inspection process.

18. The basic service set of claim 17, wherein the predetermined time interval is less than a human's ability of perception.

19. The basic service set of claim 18, wherein the OFDMA transmission sends the second data packet and the third data packet contemporaneously.

20. The basic service set of claim 19, wherein the metadata comprises a QoS tag, a safAU.streamID, or an X3D tag.

* * * * *